United States Patent
Mueller

(10) Patent No.: US 6,168,176 B1
(45) Date of Patent: Jan. 2, 2001

(54) ACCESSING STEP CONSTRUCTION ON DOWNWARDLY CURVED VEHICLE BUMPERS AND METHODS OF OPERATING AND CONSTRUCTING IT

(75) Inventor: Gerald E. Mueller, Frankenmuth, MI (US)

(73) Assignee: Bad River, Inc., Saginaw, MI (US)

( * ) Notice: Under 35 U.S.C. 154(b), the term of this patent shall be extended for 0 days.

(21) Appl. No.: 09/219,656

(22) Filed: Dec. 23, 1998

(51) Int. Cl.⁷ ....................................................... B60R 3/00
(52) U.S. Cl. ........................ 280/163; 280/164.1; 280/166; 182/88; 182/91; 182/95; 182/96; 296/50; 296/57; 296/151
(58) Field of Search .................................. 280/163, 164.1, 280/166; 182/91, 88, 96, 95; 296/146, 151, 50, 57

(56) References Cited

U.S. PATENT DOCUMENTS

| | | |
|---|---|---|
| 1,630,293 | 5/1927 | Fish . |
| 2,409,418 * | 10/1946 | Carmichael . |
| 2,678,832 | 5/1954 | Wright . |
| 2,721,345 | 10/1955 | Aken . |
| 3,067,835 * | 12/1962 | Valley . |
| 3,330,577 * | 7/1967 | Mills . |
| 3,501,190 | 3/1970 | McCrea . |
| 3,517,942 | 6/1970 | Cuffe et al. . |
| 3,528,574 * | 9/1970 | Denner et al. . |
| 3,580,613 | 5/1971 | Northrop . |
| 3,608,957 | 9/1971 | Maneck . |
| 3,623,764 | 11/1971 | Jacobus . |
| 3,627,350 | 12/1971 | Cross . |
| 3,751,068 | 8/1973 | Green . |
| 3,799,288 | 3/1974 | Manuel . |
| 3,853,369 * | 12/1974 | Holden .............................. 280/166 X |
| 3,955,827 * | 5/1976 | Wonigar ................................ 280/166 |
| 4,073,502 * | 2/1978 | Frank et al. ......................... 280/166 |
| 4,145,066 * | 3/1979 | Shearin ................................ 280/166 |
| 4,180,143 | 12/1979 | Clugston . |
| 4,198,070 * | 4/1980 | Weiler .................................... 182/91 |
| 4,231,583 * | 11/1980 | Learn ................................ 182/89 X |
| 4,274,648 * | 6/1981 | Robins .............................. 182/91 X |
| 4,275,664 | 6/1981 | Reddy . |
| 4,405,141 | 9/1983 | Jurek . |
| 4,753,447 | 6/1988 | Hall . |
| 4,930,797 | 6/1990 | Parrill . |
| 5,538,269 * | 7/1996 | McDaniel et al. ................. 182/89 X |
| 5,593,167 * | 1/1997 | Barnhardt et al. ................ 280/164.1 |

* cited by examiner

Primary Examiner—Lanna Mai
Assistant Examiner—Toan C To
(74) Attorney, Agent, or Firm—Reising, Ethington, Barnes, Kisselle, Learman & McCulloch, P.C.

(57) ABSTRACT

An accessing step, mounted on a vehicle having a bumper attached to the vehicle frame, comprises a step part and a mount assembly fixedly supported on the bumper and frame, mounting the step part for swinging movement from a first operative position in which the step part extends generally horizontally to a retracted second position pivoted upwardly to lie generally vertically adjacent the bumper. The mount assembly incorporates a lock device automatically operative between the mount assembly and step part for releasably locking the step part in the second position and automatically locking up to block the step part from downwardly swinging beyond a substantially horizontal position, while permitting the step part to be swung upwardly.

22 Claims, 4 Drawing Sheets

ACCESSING STEP CONSTRUCTION ON DOWNWARDLY CURVED VEHICLE BUMPERS AND METHODS OF OPERATING AND CONSTRUCTING IT

This invention relates to access steps which are movable from a first operative position in which the step extends generally horizontally to a second retracted storage position.

BACKGROUND OF THE INVENTION

While many prior art constructions of this type have been patented for use on the rear bumpers of vehicles such as trucks to facilitate access to the load bed of the truck, none of the previous designs have, to my knowledge, enjoyed any substantial material commercial success in the market place.

One of the principal reasons for this, in my view, has been the noise generated by the step assembly when the vehicle was driven over rough roads or rough terrain, because the step assembly was not locked in its several positions. Not only did the bouncing and jouncing encountered cause annoying rattling, with many such prior art constructions, it was possible for the step to swing down from retracted position when an undue bounce or jounce moved the step assembly sufficiently to cause it to move from retracted position. Prior art constructions, to my knowledge, were also not accommodatable to the downwardly curved bumpers now used on many vehicles.

SUMMARY OF THE INVENTION

Whereas applicant has a copending application for a step designed to be used with a bumper having a substantially flat rear face, and wherein the mount device permitting pivoting of the step operates to automatically provide gravity locking of the step in both its operative and storage positions, the present invention is directed to a step of different character. The present invention provides a pivotally mounted step with lockable connector mechanism between the step and the mount for the step, which locks up in both operative and retracted positions of the step.

One of the many objects of the present invention is to provide a bumper step assembly suitable for bumpers having vertically downwardly curved surfaces which is readily shiftable between a lower locked position of use and a retracted storage position adjacent to the inwardly curved vertical face of the bumper.

Another object of the invention is to provide a pivoted bumper step which is controlled by mechanism connecting the step and mount bracket, and which automatically locks up when the step reaches horizontal position to prevent further downward pivoting of the step and provide a rigid support platform for the step.

A further object of the invention is to provide a step or tread which is pivotal between its use and storage positions, while being connected to its mount by mechanism which locks to prevent swinging movement of the step downwardly beyond use position and while permitting the step to be readily flipped up to its storage position.

Still another object of the invention is to provide a step assembly of the character described wherein the mechanism connecting the step and its mount bracket automatically locks the step in its retracted storage position when the step moves to the storage position.

Another object of the invention is to provide a step assembly incorporating rigidifying brace mechanism for rigidly securing the step mount assembly to the vehicle frame.

A further object of the invention is to design a step assembly with a step which is prevented from contacting the bumper in both its use and storage positions.

Still another object of the invention is to provide a step which is stable and rigid in its lowered position of use.

Another object of the invention is to provide a very durable step which is relatively economical to manufacture and assemble, and which can be conveniently secured to the bumper or frame of an automotive vehicle such as a truck, camper, or trailer.

Still another object of the invention is to provide a bumper step which is safe and reliable in use and rugged in construction.

Other objects and advantages of the invention will become apparent with reference to the accompanying drawings and the accompanying descriptive matter.

GENERAL DESCRIPTION OF THE DRAWINGS

The presently preferred embodiment of the invention is disclosed in the following description and in the accompanying drawings, wherein.

DETAILED DESCRIPTION

Figure 1:
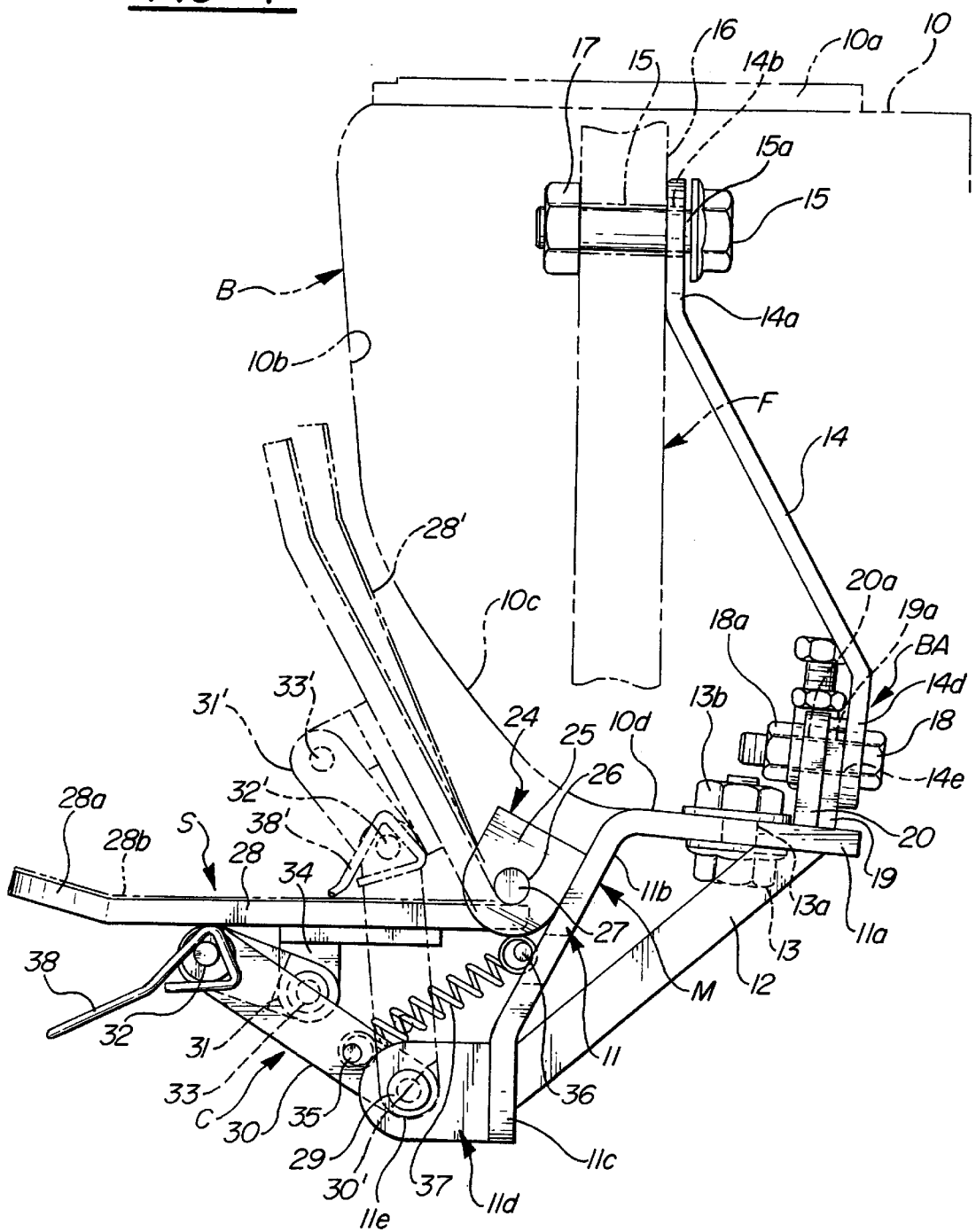
FIG. 1 is a schematic, side elevational view showing the bumper step assembly fixed to the vehicle frame and bumper and disposed in the position of use, the chain lines illustrating the movement of the bumper step to the locked folded storage position.
Figure 2:
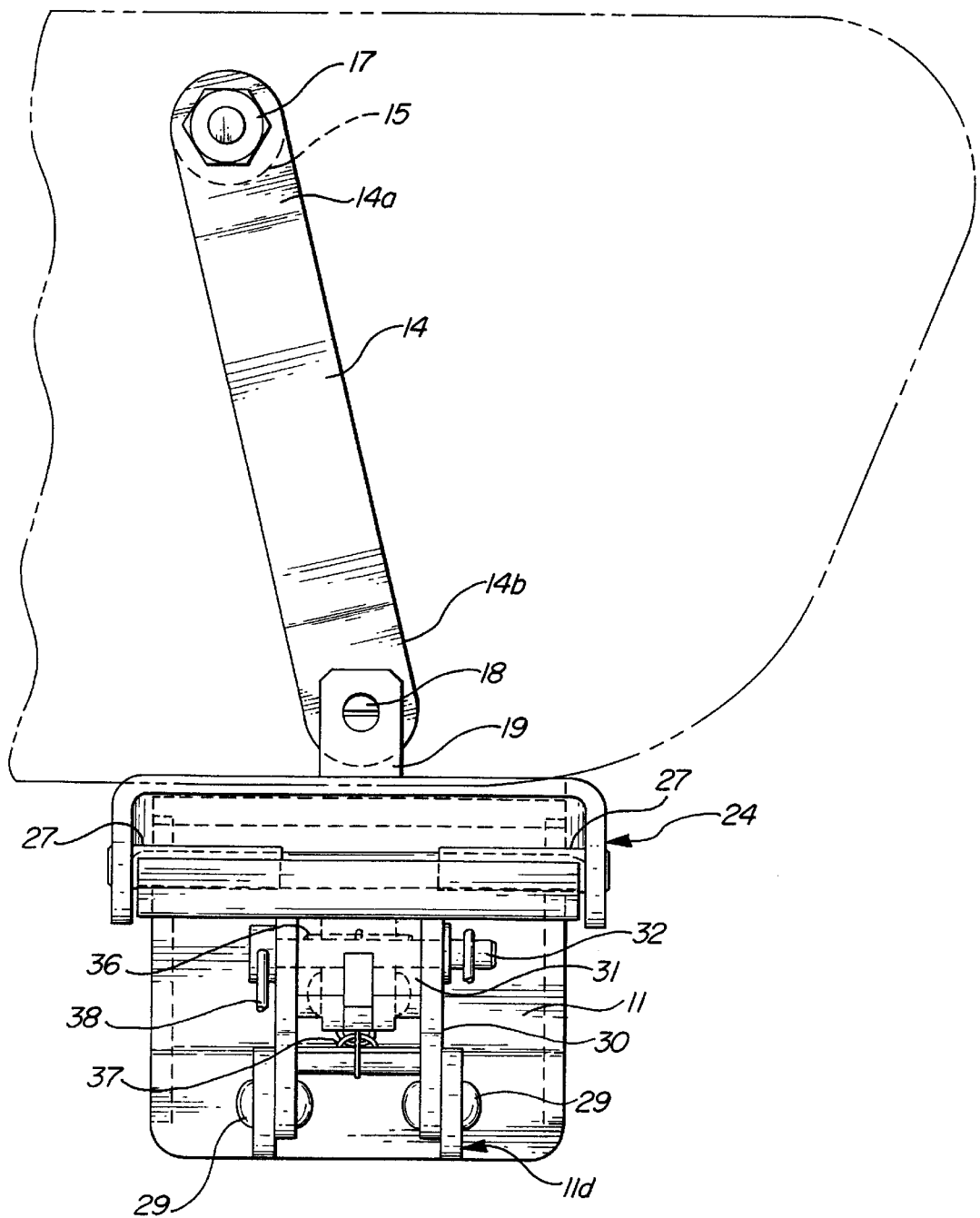
FIG. 2 is a front elevational view thereof illustrating also the lateral position of the step assembly on the end of the bumper.
Figure 5:
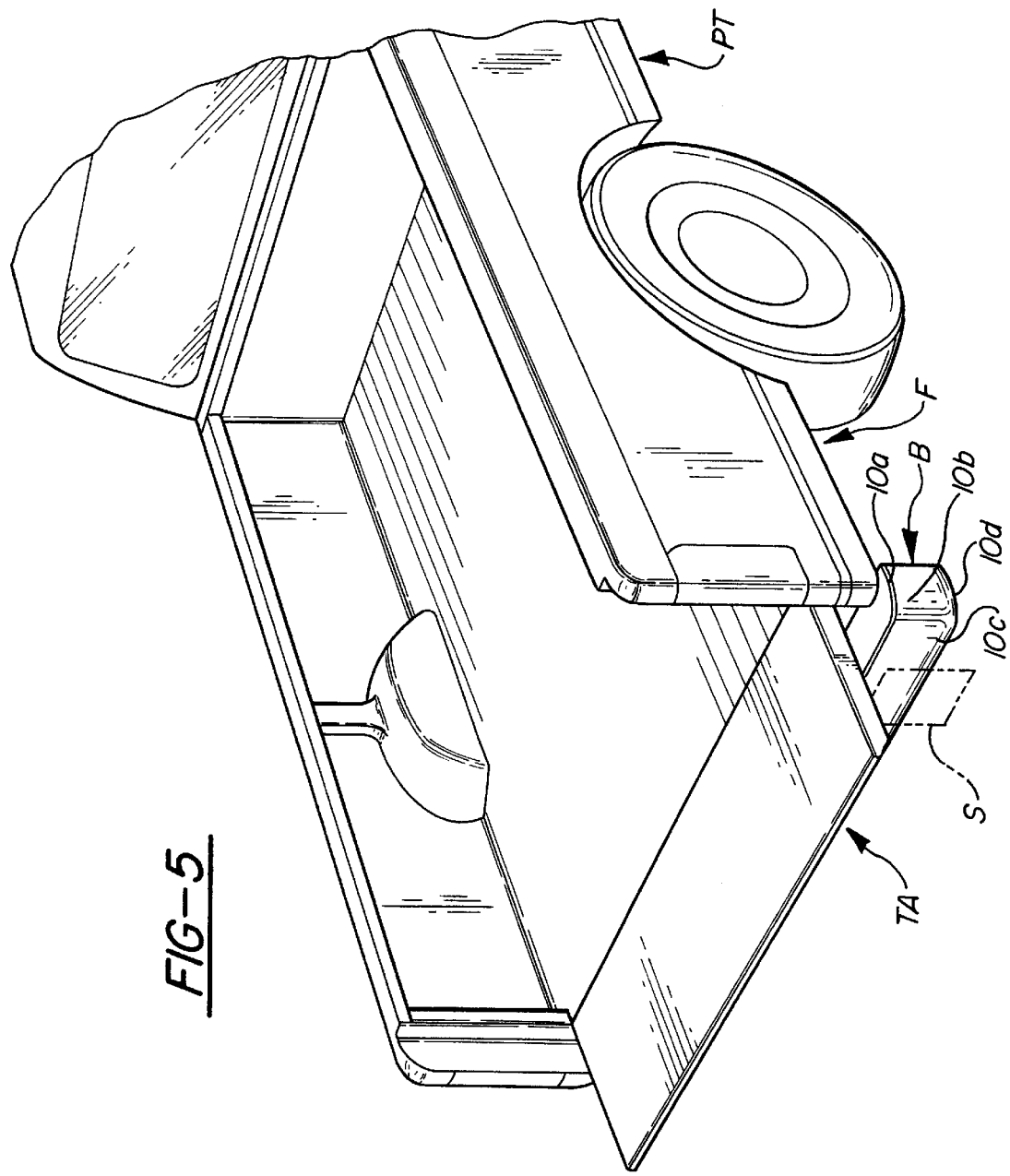
FIG. 5 is a schematic perspective elevational view of a typical pickup truck generally illustrating the position of the tailgate, bumper, and accessing step; the tailgate being shown in the down position.

Referring now more particularly, first of all, to FIGS. 1–2 and 5 of the drawings, FIG. 5 depicts the rear end of a pickup truck PT on which the rear bumper, generally designated B, is mounted in a rearwardly protruding position on the vehicle frame, generally designated F. The bumper B extends rearwardly of and below the usual pivotal tailgate assembly TA. While considered useful with other vehicles as well, the invention is particularly concerned with providing an accessing step to be mounted on the rear bumper of full size pickup trucks having downwardly and forwardly curved lower portions. The present invention is particularly designed to be readily retrofitted to such vehicles, of which many millions have been sold over the years, and to be fitted to vehicles of this type which will be manufactured in the future.

The bumper B depicted includes a generally flat upper surface 10 with an upper pad 10a thereon, and has a rear generally vertical surface configuration, including a generally flat upper surface portion 10b, and a lower downwardly curved portion 10c, terminating in a forwardly extending flange surface 10d. It is contemplated that a pair of the steps or step assemblies, generally designated S, are to be mounted on each rear bumper B, one adjacent each end of the bumper, as shown particularly in FIG. 2.

Each bumper step assembly includes a mount or mount assembly, generally designated M, which includes an angular member 11 (FIG. 1) having an upper forwardly extending horizontal portion 11a, a downwardly and rearwardly inclined portion 11b, and a vertically extending lower flange portion 11c. Brace bars 12 may be welded in position between the portions 11a and 11c as shown. A hex head bolt 13, having a cylindrical shaft portion 13a, captured in a round opening provided in the member 11 and a round opening 11a in bumper wall 10d, extends through the wall portion 10d of the bumper and may be secured by an appropriate nut 13b.

The mount M is also secured to the vehicle frame F by a brace assembly, generally designated BA, to further rigidify the mount M and provide an anti-tilt function useful, for example, when the weight of a user is not centrally applied to the step or step assembly, generally designated S.

The brace assembly includes a vertically extending strap 14 having an end 14a which may be secured by a hex head bolt or the like 15 having a cylindrical shaft portion 15a passing through an opening 14b in the portion 14a of the strap 14 and into the opening 15 provided in the frame member 16. It may be fixed by a nut 17. At its lower end 14d, strap 14 is bolted as at 18 to an upstanding bracket 19 fixed to the portion 11a of the member 11 laterally centrally thereof.

Figure 3:
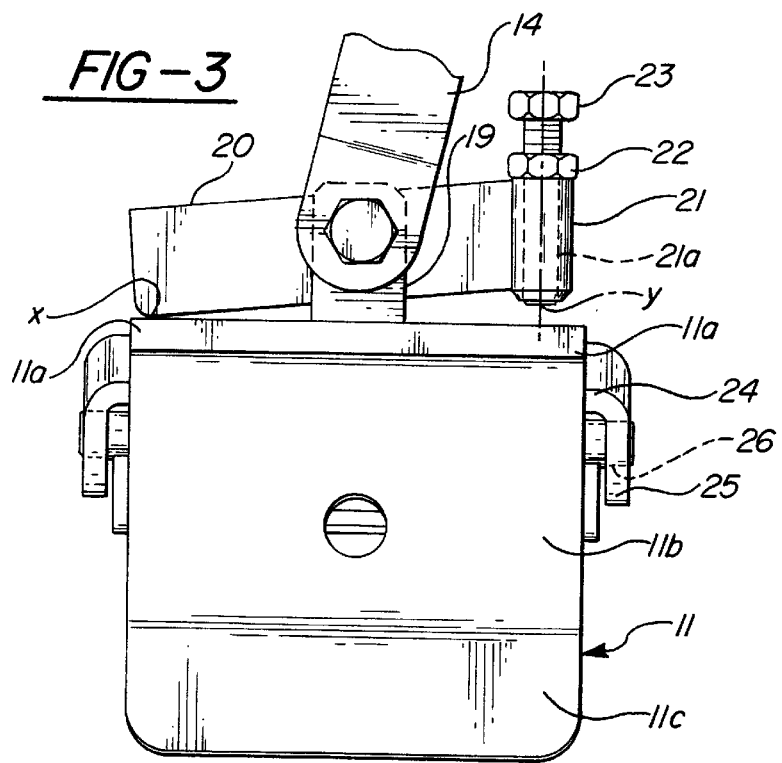
FIG. 3 is a fragmentary end elevational view thereof.
Figure 4:
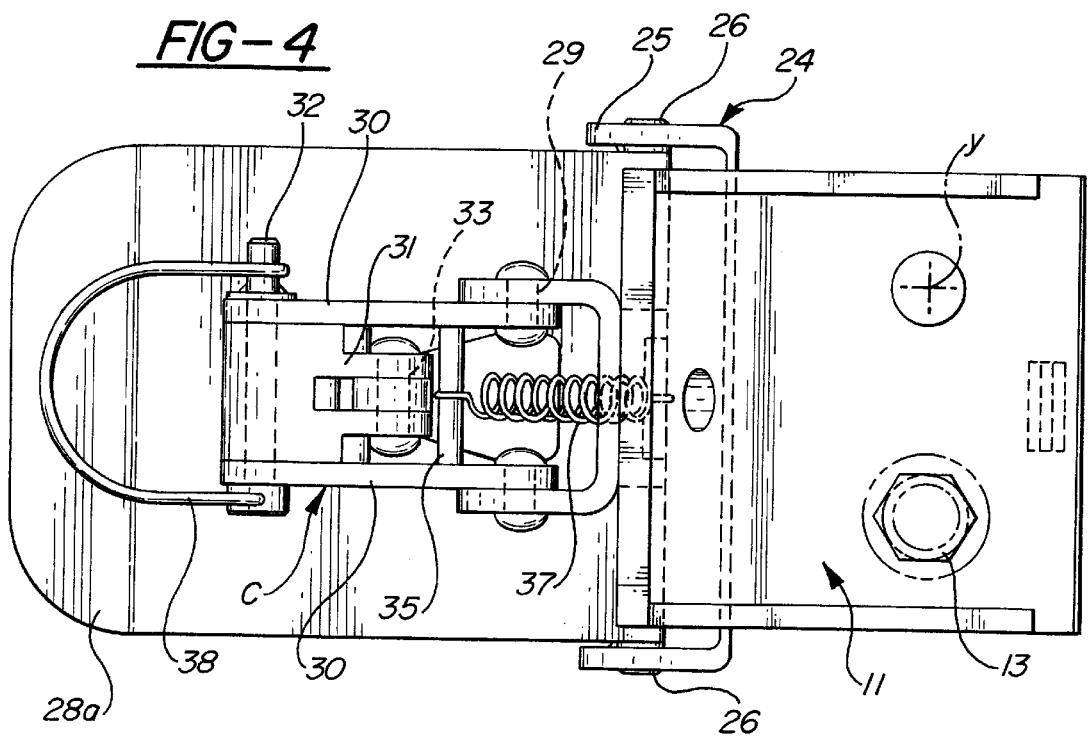
FIG. 4 is an inverse plan view of the bumper step assembly only.

To assure an anti-tilt, or anti-rock or twist function, a laterally extending bar 20 (FIG. 3) is provided in facial engagement with the bracket 19, which as FIG. 3 shows, has one end engageable with the portion 11a of the mount as at "x". The bolt 18, which is anchored by a nut 18a, passes through an opening 14e in the strap 14, an opening 19a in the bracket 19, and an opening 20a in bar 20. At its other end, anti-twist bar 20 has a threaded socket 21 to which a threaded jam nut member 22 is fixed for reception of a threaded member or bolt 23 which is threaded in the nut 22 and can be manipulated to extend downwardly through the opening 21a in the socket portion 21 of bar 20 to engage the upper surface of the bumper flange portion 10d as shown in FIG. 3 at "y". The brace structure described very safely and reliably fixes the step mount M in position.

Provided on the mount assembly M is a U-shaped pivot mount bracket, generally designated 24, having downwardly and rearwardly extending ears or end walls 25 with pivot openings 26 therein. Pins 27, which weld to the upper surface of the step or tread plate 28 of the step assembly S, are freely rotatable in the openings 26. Alternatively, the pins 27 could be fixed to the ears 25 and bearings to receive them could be fixed to the tread plate 28.

It will be observed that the tread plate or step portion 28 has a rearwardly and upwardly inclined terminal edge 28a for the purpose of deflecting the foot of a user inwardly and tending to prevent the foot from slipping off the step portion 28. The tread plate 28 is also provided with raised tread pads 28b thereon in a suitable tread configuration.

The pivoting of step portion 28 is controlled by a connector and lock assembly, generally designated C, which extends beneath the step 28 and connects the step portion 28 to the mount assembly, generally designated M. The connector assembly C is designed to automatically lock the step portion or step 28 in the pivotally raised storage position in which it is depicted by chain lines at 28' in FIG. 1. It further is designed to lock up and furnish a fixed platform on which the tread plate 28 is supported in horizontal position, when the plate 28 is released and swung down to the use position.

It will be noted that the mount assembly M has a pair of rearwardly extending ears, generally designated at 11d, with openings 11e for receiving pins 29 on which a pair of elongate links 30 are pivotally received. At their upper ends, the links 30 are pivotally connected to a shorter link, generally designated 31, by a pivotal shaft 32. At its opposite end, the link 31 is pivotally connected as at 33 to a centrally dependent post 34, which is fixed to the step portion or tread plate 28. Also connected between the links 30, rearwardly of the shaft 29, is a spanning pin 35 which cooperates with a pin 36 fixed laterally centrally to the portion 11b of the mount member 11. The hook ends of a coil spring 37 are hooked in the usual manner to encircle the pins 35 and 36 and secure the coil spring 37 between them.

Pivotally provided on the pin member 32 is a bale-shaped handle 38, which is useful to release the step plate 28 when it is in the raised storage position shown at 28'. In this position of the links 30 and 31, designated 30' and 31', and shown in chain lines, the links are in over center position and accordingly lock the tread plate 28 in this storage position. The spring 37, which is in an extended tensily stressed condition in the solid line position shown in FIG. 1, operates when the tread plate 28 is raised upwardly a predetermined distance to pull the links 30 into the over center position and, at the same time, moves the tread plate 28 the final increment into the 28' position.

THE OPERATION

With the step having reached the storage position at 28' in the manner explained previously, it is only necessary when it is desired to use the step, to pull on the handle 38, shown in the 38' position in FIG. 1 rearwardly to move the pivot pin 33, shown schematically at 33', rearwardly beyond the position of parallelism of links 30 and 31 to unlock the locked position of the links. The step 28 will then descend under the influence of the forces of gravity toward the position in which it is shown in solid lines in FIG. 1. As the shorter link 31 and longer links 30 swing downwardly, the link 31 moves from the position shown at 31' beyond the position of parallelism with the link 30 and swings inwardly or forwardly in generally a 180 degree arc to a position in which it locks with respect to the links 30. The locking occurs because any further pivoting of the link 31 would need to pivot the links 30 upwardly as opposed to permitting gravity to swing them downwardly. The center line distances between the pivot points 33' and 32' are chosen to accomplish a lock up of the links 30 and 31 constituting the connector lock C at a point where the step tread 28 extends substantially horizontally as FIG. 1 demonstrates.

To restore the step or step assembly S to its storage position once again, it is merely necessary to flip the end 28a of the treat plate 28 upwardly to a position in which the spring 37 takes over. The upward flipping movement, which is permitted by the links 30 and 31, can be readily accomplished with the hands or with a foot, or may result from contact with another body as, for example, if the vehicle were inadvertently backed into something with the step assembly inadvertently in the down position.

METHOD OF MAKING

The step assembly described can be relatively simply manufactured and installed. Normally, the mount assembly M described is separately manufactured and the links 30 and 31 are mounted to it with the spring 37 unattached. The length of link 31 and the links 30 are predetermined such that they will relatively lock up in the relative angular positions indicated to form a base or platform for supporting the tread plate 28, the only connection to the plate 28 being at the downwardly projecting lug projection 34. The length of this projection 34 is also predetermined to dispose the link 31 in the desired position with respect to pin 32. The next step in the process is to insert the pins 27 through the openings 26 and weld or otherwise fix them to the tread plate 28. Then the mount M can be secured to the bumper and bumper frame by positioning and tightening down the bolts 13 and 15. The laterally outboard bolt 23, carried by the anti-twist or tilt bar 20, is adjusted to fit with the particular bumper B before the bolt 18 is tightened down. Finally, spring 37 can be connected.

It is to be understood that the embodiments described are exemplary of various forms of the invention only and that the invention is defined in the appended claims which contemplate various modifications within the spirit and scope of the invention.

I claim:

1. In combination with a vehicle having a frame, a rear tail gate movable on the frame from a raised position to an open position, and a rear bumper having an upper surface and a rearward face with a forwardly and downwardly extending inset portion terminating in a forwardly extending surface, and attached to the vehicle frame; a step assembly comprising:
   a. a step, of a width to receive a foot, having an underside; and
   b. a step mount assembly fixedly supported on said bumper and frame, and having a swinging connection with said step, mounting said step for swinging movement on said mount assembly from a first operative position in which said step extends generally horizontally rearwardly to a retracted second position pivoted upwardly to lie generally vertically adjacent said bumper;
   c. said mount assembly incorporating a bumper mounted support and a lock device connecting between said support and the underside of said step automatically operative between said support and step for releasably locking said step in said second retracted position and automatically locking up to block said step from being downwardly swung beyond a substantially horizontal position, while permitting it to be swung upwardly.

2. The combination defined in claim 1 wherein said mount assembly includes a brace device fixed to said frame and reacting between said bumper and mount assembly to limit any tendency of said mount assembly to tilt laterally with respect to said bumper.

3. The combination defined in claim 2 wherein said bumper has a rear to front extending lower side edge portion with an upper surface and said brace device incorporates a lateral bar extending generally coextensively with said bumper and bearing at one end on said mount assembly and on the other end on the upper surface of said lower edge of said bumper.

4. The combination of claim 3 wherein said lateral bar incorporates an adjustable vertical member threaded to be received by said bar and extending therefrom to engage said surface of the bumper.

5. The combination of claim 1 wherein said lock device comprises first and second connected links between said mount assembly and step assuming an over-center locked position and serving as a stable platform for the underside of said step in said first position.

6. The combination defined in claim 1 wherein said lock device incorporates a link system comprising a first link pivotally connected to said step and a second link pivotally connected to said mount assembly, which are pivotally connected to be movable to an over center position when said step moves to said second position to lock said step in retracted position.

7. The combination defined in claim 6 wherein a spring device connected between said mount assembly and one of said links assists in moving said second link to achieve said over center position and in maintaining said step in said second position.

8. The combination defined in claim 5 wherein said step includes a step portion and a connector lug extending downwardly therefrom when the step is in its first position, and said first link connects to said connector lug at a position below the said step portion to pivot said second link upwardly to said locked position beneath said step portion to support the step portion in its first position at the end of the downward swinging arc of said step portion.

9. The combination defined in claim 8 in which downward swinging movement of said second link is prevented by any further swinging of said first link achieving a position requiring further upward swinging of said second link, and so locking said first and second links to form a platform positively supporting said step portion.

10. A step assembly for a vehicle having a frame and a bumper with an upper surface and a generally vertical face with a downwardly and inwardly extending portion terminating in an inwardly extending flange surface comprising:
    a. a step plate, of at least a width to receive a foot; and
    b. a step mount assembly adapted to be supported on said bumper and frame, and having a swinging connection with said step plate, mounting said step plate for swinging movement on said mount assembly from a first operative position in which said step plate extends generally horizontally to a retracted second position pivoted upwardly to lie generally vertically adjacent said bumper;
    c. said mount assembly incorporating a lock device connecting with said step plate and automatically reactive with said step plate when the step plate is swung upwardly to retracted position for releasably locking said step in said retracted second position and automatically reacting with said step plate when the step plate moves downwardly to said first position to prevent said step plate from being swung beyond a substantially horizontal position.

11. The combination defined in claim 10 wherein said mount assembly includes an anti-tilt brace device adapted to be fixed to said frame and reacting between said bumper flange and mount assembly to limit any tendency of said mount assembly to tilt laterally with respect to said bumper.

12. The combination defined in claim 11 wherein said brace device incorporates a lateral bar for extending generally coextensively with said bumper and for bearing at one end on said mount assembly and on the other end on said flange surface.

13. The combination of claim 12 wherein said lateral bar incorporates an adjustable vertical member threaded to be received by said bar and extending therefrom for engaging said flange surface of the bumper.

14. The combination of claim 10 wherein said lock device comprises a connector assembly between said mount assembly and step plate assuming a locked position and serving as a stable platform for the step plate in said first position.

15. The combination of claim 10 wherein said lock device incorporates a link system comprising a first link pivotally connected to said step plate and a second link pivotally connected to said mount assembly, which are pivotally connected to be movable to an over center locked position when said step plate moves to said second position to lock said step plate in retracted position.

16. The combination defined in claim 15 wherein a spring device connected between said mount assembly and one of said links assists in relatively moving said links to achieve said over center position and in maintaining said step plate in said second position.

17. The combination defined in claim 15 wherein said step plate includes a step portion and a connector lug extending downwardly therefrom when the step plate is in its first position, and said first link connects to said connector lug at a position below the said step portion to pivot said second link upwardly to said locked position beneath said step portion to support the step portion in its first position at the end of the downward swinging arc of said step portion.

18. The combination defined in claim 17 in which downward swinging movement of said second link is prevented by any further swinging of said first link achieving a position requiring further upward swinging of said second link, and so locking said first and second links to form a platform positively supporting said step portion.

19. A method of constructing a step assembly for a vehicle having a frame and a bumper fixed thereto having an upper surface and a generally vertical face with a downwardly and inwardly extending inset portion terminating in an inwardly extending flange surface comprising the steps of:

a. providing a step, of at least a width to receive a foot, having an underside; and b. providing a mount assembly, adapted to be supported on said bumper and frame, mounting said step for swinging movement from a first operative position in which said step portion extends generally horizontally rearwardly to a retracted second position pivoted upwardly to lie generally vertically adjacent said bumper; and c. connecting a lock device between said mount assembly and the underside of said step which releasably locks said step in said second position and which locks up to block said step from being pivoted beyond a generally horizontal position.

20. The method defined in claim 19 further comprising:

a. connecting said mount assembly to said bumper terminal flange surface;

b. securing an upwardly extending brace device between said mount assembly and frame; and c. pivotally providing a lateral bar on said mount assembly to extend generally coextensively with said bumper and securing it to bear at one end on said mount assembly and on the other end on said flange surface of said bumper.

21. The method of claim 20 including the step of providing an adjustable vertical member threaded to be received by said bar, and extending said vertical member therefrom to engage said flange surface of the bumper.

22. The method of claim 20 comprising providing said lock device as a link system including a first link pivotally connected to said step and a second link pivotally connected to said mount assembly, the links being pivotally connected to be movable to an over center position when said step moves to said second position to lock said step in retracted position and being so connected to said step portion that further downward swinging movement of said second link when said step portion generally reaches said first position is prevented by any further swinging of said first link achieving a position requiring further upward swinging of said second link, and so locking said first and second links to form a platform positively supporting said step portion.

* * * * *